Patented Sept. 12, 1950

2,522,254

UNITED STATES PATENT OFFICE 2,522,254

SOLUTIONS OF POLYMERS OF CROTYL, METHALLYL, AND ALLYL POLYESTERS OF POLYBASIC ORGANIC ACIDS CONTAINING CERIUM SALTS AND PROCESS OF MAKING FILMS THEREFROM

Albert G. Chenicek, Hartsdale, N. Y., assignor to Interchemical Corporation, New York, N. Y., a corporation of Ohio No Drawing. Application April 24, 1946, Serial No. 664,711

5 Claims. (Cl. 260—78.5)

This invention relates to polymers of crotyl, methallyl and allyl polyesters of polybasic organic acids, and is directed specifically at the use of solvent-soluble cerium salts for the purpose of hastening the thermosetting of such polymers.

It has long been known (see Kronstein U. S. Patent No. 843,401, February 5, 1907) that the esters of allyl alcohol and polybasic organic acids could be polymerized to produce synthetic resins useful as solid plastics, and in the coating industries. The polymerization may be effected by heating the monomer alone, or in solution in an organic solvent, with or without a catalyst. The reaction mixture, containing polymer and unreacted monomer, is then treated with a liquid which dissolves the monomer and either does not dissolve the polymer, or precipitates it from solution. The solution of monomer may then be treated to separate monomer and precipitating solvent.

The solutions of the polymers in organic solvents make excellent coating compositions with properties depending on the particular monomer employed. All of them can be set by heat to insoluble films, temperatures of the order of 400–450° F. being necessary to develop optimum film properties. It has been proposed to hasten the time of setting by using metallic catalysts such as cobalt salts, and salts of other metals, but their utilization is attended by certain difficulties; one of these is that the metals often lower the resistance of the film to outside influences; but the most important one is that color is adversely affected—the films without catalyst are much paler than the catalyzed films.

I have discovered that solvent-soluble cerium salts—e. g. cerium naphthenate, cerium linoleate, etc., powerfully catalyze the thermosetting of polymerized allyl, crotyl and methallyl polyesters of polybasic organic acids, without affecting either the resistance of the films, or the color. The catalytic effect is so pronounced that the use of 0.05% of cerium salt, as metal, permits thermosetting equivalent to 400° F. at a temperature of 250° F., and reduces the time required at 400° F. from the order of 20–30 minutes to the order of 3–5 minutes. By way of example the following are given:

Example I

A 16% solution of 2:1 diallyl phthalate:diallyl sebacate copolymer in toluene was divided into two portions. In one portion was dissolved 0.7% by wt. of polymer of cerium naphthenate (14% Ce). Films from both solutions were flowed on steel and the panels baked at 350° F. After 20 minutes, the film containing catalyst was hard and unaffected by solvents, while the other film was still soft and attacked by solvents.

Example II

A 20% solution of diallyl phthalate polymer in xylene and cyclohexanone was used to form a film on steel plate. The panel was baked in an oven at 300° F. After 4.5 hours, the film was still softened by acetone. Another film from the same solution, but containing 0.7% by wt. of cerium naphthenate, was cured after 20 minutes heating at 300° F.

Example III

A film of 2:1 diallyl phthalate:diallyl sebacate copolymer on steel required 20 minutes of heating at 400° F. to become cured. A film of the same copolymer containing 0.35% of cerium naphthenate was cured after 3 minutes heating at 400° F.

Example IV

A film on steel of 2:1 diallyl phthalate:diallyl sebacate copolymer containing 1% of cerium as naphthenate, was baked at 250° F. The time required for cure was 20 minutes. Without catalyst, the same resin was still soluble after heating under the same conditions.

Example V

Films of diallyl adipate polymer on steel, one without catalyst and the other with 0.1% of cerium as the naphthenate, were baked at 300° F. After 35 minutes, the film with catalyst was completely cured while the one without catalyst was still affected by solvents after 4.5 hours of heating.

Example VI

Example V was repeated with 9:1 diallyl phthalate: diallyl sebacate copolymer. Again the film with catalyst was cured in 35 minutes while the film without catalyst was not cured after 4.5 hours of heating.

Example VII

Films of dimethallyl phthalate polymer, one without and one with 0.7% cerium naphthenate as catalyst, were baked at 350° F. After 15 minutes, the film with catalyst was cured while the one without catalyst required 60 minutes of baking to cure.

*Example VIII*

A film of steel of 2:1 diallyl phthalate:diallyl azelate copolymer containing 0.1% of cerium as naphthenate was cured in 5 minutes at 350° F. The same resin, without catalyst, was still soluble after heating under the same conditions.

Having described the invention and the best manner I have found for carrying it into effect, what I claim is:

1. A process for obtaining pale, durable films which comprises converting to film form, a volatile organic solvent solution of polymer of polybasic organic acid polyester of an unsaturated aliphatic alcohol of the class consisting of allyl, crotyl and methallyl alcohols and containing dissolved therein as catalyst an effective amount up to 1% of a soluble cerium salt, and heating the film to a temperature of 250° to 400° F. to evaporate the solvent and bake the resultant resin film.

2. A coating composition comprising a solution in organic solvent, which is volatile at 250° to 400° F., of a polymer of polybasic organic acid polyester of an unsaturated aliphatic alcohol of the class consisting of allyl alcohol, crotyl alcohol, and methallyl alcohol and containing dissolved therein as catalyst an effective amount of up to 1% of a soluble cerium salt.

3. A coating composition comprising a solution in organic solvent, which is volatile at 250° to 400° F., of a polymer of polybasic organic acid polyester of an unsaturated aliphatic alcohol of the class consisting of allyl alcohol, crotyl alcohol, and methallyl alcohol and containing dissolved therein as catalyst an effective amount of up to 1% of cerium naphthenate.

4. A coating composition comprising a solution in organic solvent, volatile at 250° to 400° F., of diallyl phthalate polymer and containing dissolved therein as catalyst an effective amount up to 1% of a soluble cerium salt.

5. A coating composition comprising a solution in organic solvent, volatile at 250° to 400° F., of diallyl phthalate: diallyl sebacate copolymer and containing dissolved therein as catalyst an effective amount up to 1% of cerium naphthenate.

ALBERT G. CHENICEK.

REFERENCES CITED

The following references are of record in the file of this patent:

UNITED STATES PATENTS

| Number | Name | Date |
|---|---|---|
| 2,218,439 | Rothrock | Oct. 15, 1940 |
| 2,238,030 | Bradley | Apr. 15, 1941 |
| 2,311,327 | Bradley | Feb. 16, 1943 |
| 2,321,942 | Rothrock | June 15, 1943 |
| 2,394,742 | Bent | Feb. 12, 1946 |